United States Patent [19]
Burek et al.

[11] Patent Number: 5,995,700
[45] Date of Patent: Nov. 30, 1999

[54] MASS FUSION SPLICE TRAY

[75] Inventors: Denis Edward Burek, Cumming; Gary Simpson Cobb, Norcross; Marc Duane Jones, Lithonia; Wesley Willing Jones, Lawrenceville, all of Ga.

[73] Assignee: Lucent Technologies Inc., Murray Hill, N.J.

[21] Appl. No.: 09/007,636

[22] Filed: Jan. 15, 1998

[51] Int. Cl.⁶ .................................................. G02B 6/36
[52] U.S. Cl. ........................................................ 385/135
[58] Field of Search ..................................... 385/134, 135

[56] References Cited

U.S. PATENT DOCUMENTS

| | | | |
|---|---|---|---|
| 4,332,435 | 6/1982 | Post | 350/96.2 |
| 4,679,896 | 7/1987 | Krafcik et al. | 350/96.2 |
| 5,097,529 | 3/1992 | Cobb et al. | 385/135 |
| 5,434,945 | 7/1995 | Burek et al. | 385/135 |
| 5,472,160 | 12/1995 | Burek et al. | 248/74.4 |
| 5,647,045 | 7/1997 | Robinson et al. | 385/135 |
| 5,774,618 | 6/1998 | Jones | 385/135 |

Primary Examiner—Hung N. Ngo

[57] ABSTRACT

A mass fusion splice tray assembly increases the capacity of a splice closure which has support members thereon for supporting the assembly. The assembly include a splice tray which latches to a support member and which has locating slots to contain two splice holder inserts. A cover member has latching legs which latch to wedge shaped latches on the splice tray. The cover member is adapted for pivotally mounting a discrete splice tray on the top surface thereof so that the total splice capacity of the splice tray assembly is increased.

8 Claims, 8 Drawing Sheets

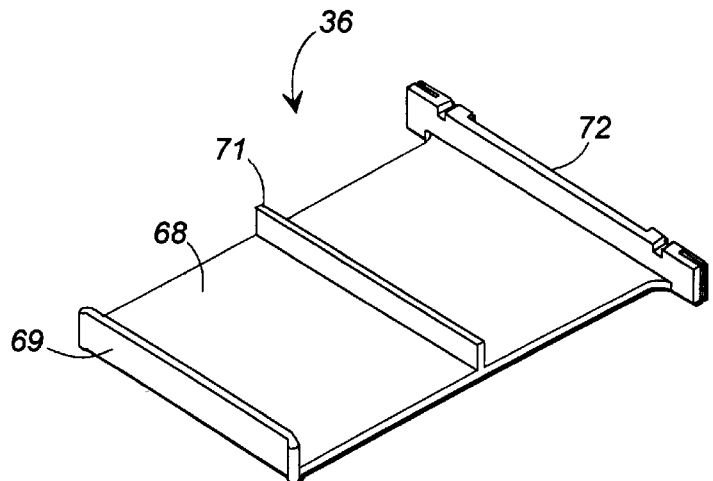
FIG. 3A
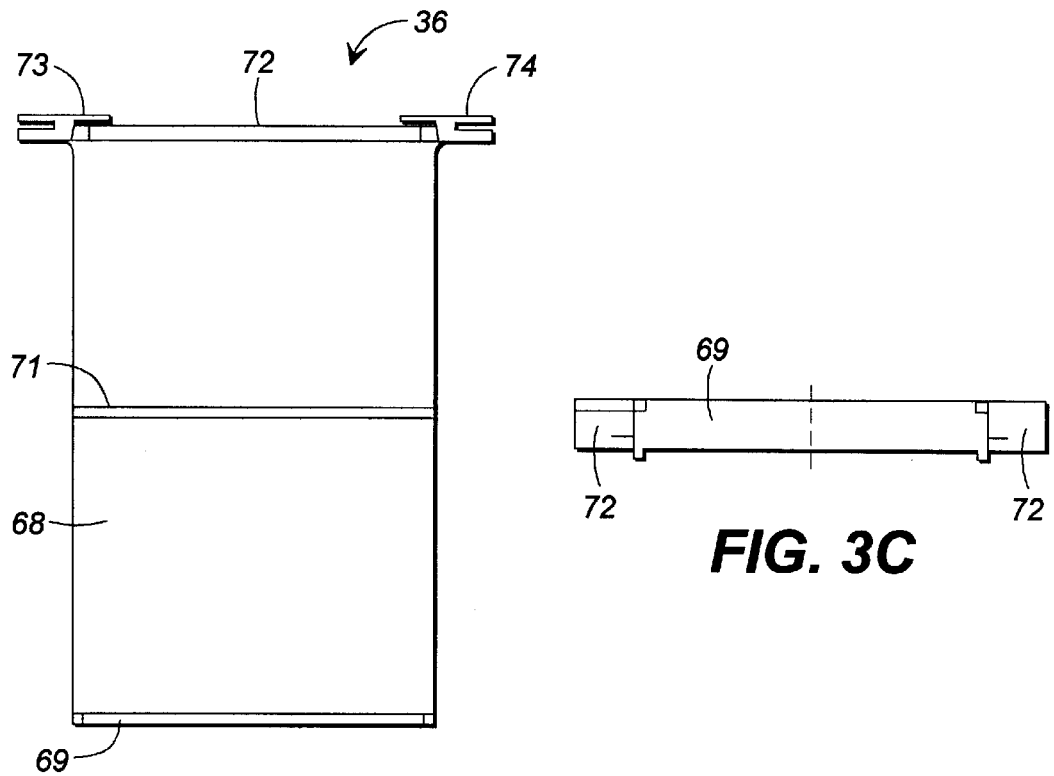
FIG. 3B
FIG. 3C
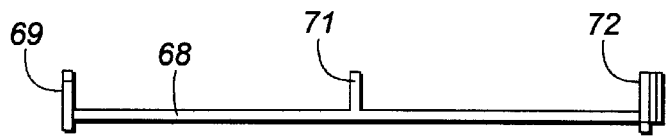
FIG. 3D

FIG. 4A  FIG. 4B

MASS FUSION SPLICE TRAY

FIELD OF THE INVENTION

This invention relates to optical fiber cable splice closures and, more/ particularly, to a mass fusion splice tray assembly for use in such a closure.

BACKGROUND OF THE INVENTION

Signal transmission through optical fibers has become, or is becoming, the dominant signal transmission mode. The bandwidth characteristics of optical fibers, as well as their relative immunity to certain types of interference and contaminants make them the desirable transmission medium in high capacity trunk lines as well as in lower capacity feeder and distribution lines.

No matter what the intended end use may be, individual optical fibers generally are combined in an optical fiber cable which contains a plurality of such fibers, each of which is protected by at least one layer of coating material. In one configuration, the fibers are assembled into groups which are held together by binder ribbons or tubes to form a cable core. This is generally enclosed in a metallic or plastic tube or jacket which, in the latter case, often contains a strength member. In another configuration, the fibers are arrayed in ribbon form and the core tube contains one or more stacked ribbons.

Regardless of the cable configuration, it is usually necessary that the lengths of fiber cable be spliced at their ends to the ends of other cables, which entails splicing each of the individual fibers in a cable to a corresponding individual fiber in the second cable. To this end, there is provided a splice closure which usually comprises a protective case which contains at least one splice tray which, in turn, has a plurality of splice holders mounted thereon, into which the encased individual fiber splices are inserted and held. The cables are entrant into the case and generally are clamped to each end thereof to reduce the effects of tensile forces on the cables and on the splices. Sufficient amounts of fiber slack must be provided for within the case, such as, for example, half a meter of fiber length so that the individual fibers can be pulled clear of the case to effect the splice. The slack also serves the important function of absorbing tensile forces, thereby isolating the splices from such forces. Because of the delicate and brittle nature of individual glass fibers, they cannot be crimped or bent too sharply, i.e., bent to too small a radius of curvature, which places restraints upon slack storage. Thus, there have been numerous arrangements in the prior art addressing the problem of fiber and slack storage, as exemplified by U.S. Pat. Nos. 5,097,529 of Cobb, et al.; 4,679,896 of Krafcik, et al.; and 4,332,435 of Post.

Inasmuch as, at the splice point, the cable itself is opened up and the base fibers are exposed, the only protection afforded the fibers is provided by the closure, which can provide only one or two layers of protection from the outside environment, the requirements therefor being more stringent than for the cable, which normally provides several layers of protection. The closure must anchor the cables stored therein, and it must be capable of withstanding torsional and axial loads transmitted by the cable to the closure so that the splices are protected from these loads. The closure must also seal the inner and outer sheaths of the cables and maintain the seal integrity under extreme environmental conditions. In addition, the closure must provide adequate fiber storage for slack fiber without damaging the fibers and without increasing signal attenuation. The closure preferably should be capable of storing any type of splice, such as, for example, discrete mechanical, discrete fusion, mass fusion or mass mechanical, or other types while reducing forces that tend to damage the splices. Additionally, the closure should provide adequate grounding and anchoring for the metallic strength members of the cable. The closure should also be capable of accepting high fiber count cables as well as those of low fiber count.

Typically, prior art splice closures are somewhat complex, difficult to assemble, are necessarily bulky, and, in use, difficult to access. As a consequence, they are not economical when used for splicing relatively low count fiber cables, such as, for example, drop cables or CATV applications. Also, when used for low fiber count cables, the bulkiness of the closure makes it difficult to provide adequate storage room, without sacrificing accessibility. This problem of size has heretofore been addressed by simply using a large closure designed primarily for high capacity use, where feasible, or by designing special, smaller closures for low capacity use, which cannot carry or contain large numbers of fibers and splices.

In order to insure protection of the splices from moisture, it is current practice to form the closure out of two mating halves, with a grommet therebetween, and clamp them together. Cable entry is through openings in the grommet, which are usually supplied with inserts which seal the cable and in turn are sealed by the grommet. Such a grommet and insert arrangement is shown, for example, in U.S. Pat. No. 5,472,160 of Burek, et al.. In that arrangement, the grommet, which is of a resilient material suitable for moisture sealing, has, at each end thereof, first and second seal members having bores therein for receiving grommet inserts, which, in turn have bores therein for receiving the cable. The seal members are preferably split longitudinally so that the grommet inserts, with cables extending therethrough, can be inserted in the seal members and be tightly embraced thereby. When the two halves of the housing are clamped together, the cable is tightly embraced, as are the seal members, so that a watertight seal is achieved.

In usage, it has been found that such a sealing arrangement can be vulnerable to a bending or flexing of the cable adjacent the entrance to or exit from the closure, which can, in some instances break the integrity of the seal. There have been various arrangements in the prior art for correcting this effect, one such arrangement being shown in U.S. Pat. No. 5,434,945 of Burek, et al. wherein the closure is encased in a protective shell which, after assembly, is filled with an encapsulant. Such an arrangement insures that the splice closure itself is virtually certain to be moisture proof. However, access to the splices is made more difficult by the presence of the encapsulant, which must be removed to permit such access. For high fiber count cables, limited access, while undesirable, does not necessarily pose too much of a problem. However, for low fiber count cables, where frequent access may often be required, such difficulty of access is undesirable.

In U.S. patent application Ser. No. 08/847,214 of Burek, et al., the disclosure of which is incorporated by reference herein, there is disclosed and claimed a splice closure assembly which incorporates a number of features aimed at overcoming the various short-comings of the prior art arrangements discussed in the foregoing. The basic design of that closure and the components thereof is such that the enclosure is substantially completely moisture proof without requiring an encapsulant or inner and outer closures, affords more than adequate space for storing fiber slack, protects the fiber splices themselves from tensile and other physical forces, is adaptable to different types of splice trays including mass splice trays, and affords a high degree of accessibility to the fiber splices. The splice closure of that application has a floored base portion and a cover portion which define an enclosure having a longitudinal axis and first and second ends. Mounted to the floor are first and second pedestals which hold splice holders or trays in an elevated position above the floor, thereby providing slack fiber storage space below the trays and above the floor.

The Burek el al. enclosure is designed to hold four discrete fiber splice trays or one mass fusion splice tray and one discrete splice tray attached to the top thereof. When only discrete fiber splice trays are used, the maximum fiber count is one hundred and forty-four (144) fiber splices, and when a mass splice tray and one discrete splice tray are used, the maximum count is three hundred and twenty-four (324) fused splices, or one hundred and eighty (180) mechanical splices. However, the present status of the art is such that fiber counts in cables are increasing at rates too fast for development of closures to accommodate them. Thus, four hundred and thirty-two (432) fibers in a cable are now being used on a regular basis and, where the Burek, et al. closure could handle eighty (80%) of all closure applications, that percentage has now decreased. Clearly increased capacity of the Burek, et al. closure is needed.

SUMMARY OF THE INVENTION

The present invention is a mass fusion splice tray assembly which materially increases the capacity of the Burek, el al. closure, without necessitating any material change in the size or configuration of that closure. The mass fusion splice tray is smaller than a mass splice tray, inasmuch as it does not require storage of fiber in the tray as does the mass splice tray. Inasmuch as the mass fusion splice tray is generally used with fiber ribbon, which inherently protects the fibers contained therein, the slack ribbon can be stored in the base of the closure, between the floor and to splice tray assembly. As a consequence, and in accordance with its present invention, two mass fusion splice trays may be used in the Burek el al. closure. The splice tray assembly of the present invention comprises first and second splice trays of suitable plastic material, each tray being adapted to be mounted on top of one of the pedestals of the Burek, el al. closure. In almost all cases, where mass fusion splicing is used, it is because the fibers to be spliced are contained in ribbons, and are well protected. Thus, the slack ribbon is stored in the base of the closure instead of in the splice tray. The mass fusion splice tray is designed with open sides so that each ribbon enters one side of the tray, is spliced, with the splice holders or inserts being mounted, one on top of the other, in the tray, and exits the other side of the tray. Each splice tray is mounted on a pedestal and securely held thereto, and has two holders stacked therein. Each holder accepts twelve fusion splices for a total of twenty-four (24) splices per tray, or forty-eight splices per closure. Thus, where twelve fiber ribbon is used, the closure can hold five hundred and seventy-six (576) fiber splices.

A cover member, which snaps over the splice trays, is adapted to hold two discrete fiber splice trays of the type shown in the Burek el al. application, each of which accepts a maximum of thirty-six fiber splices. Thus, the total number of splices that can be contained in the closure utilizing the present invention is six hundred and forty-eight (648). Thus, the splice holding capacity of the Burek, et al. closure is doubled by virtue of the present invention.

As an additional securing means, a Velcro® strap on each pedestal is designed to loop over the cover, and over the discrete splice trays pivotally mounted on top of the cover member to maintain the discrete splice trays in position and the clear flexible cover thereof held down to keep the discrete fiber splices in position.

It will be more apparent from the following detailed description, read in conjunction with the drawings, that the spice tray assembly of the present invention is of relatively simple construction which being capable of holding large numbers of splices. In addition, the assembly and disassembly of the splice tray assembly can be performed quickly, and ready access to any particular splice or splices is provided.

DESCRIPTION OF THE DRAWINGS

FIG. 3A is a perspective view of the splice holder insert;

FIG. 3B is a plan view of the splice holder insert;

FIG. 3C is an end elevation view of the splice holder insert;

FIG. 3D is a side elevation view of the splice holder insert;

FIG. 4A is a plan view of the splice holders in the splice holder insert;

FIG. 4B is a side elevation view of the combination of FIG. 4A;

DETAILED DESCRIPTION

Figure 1:
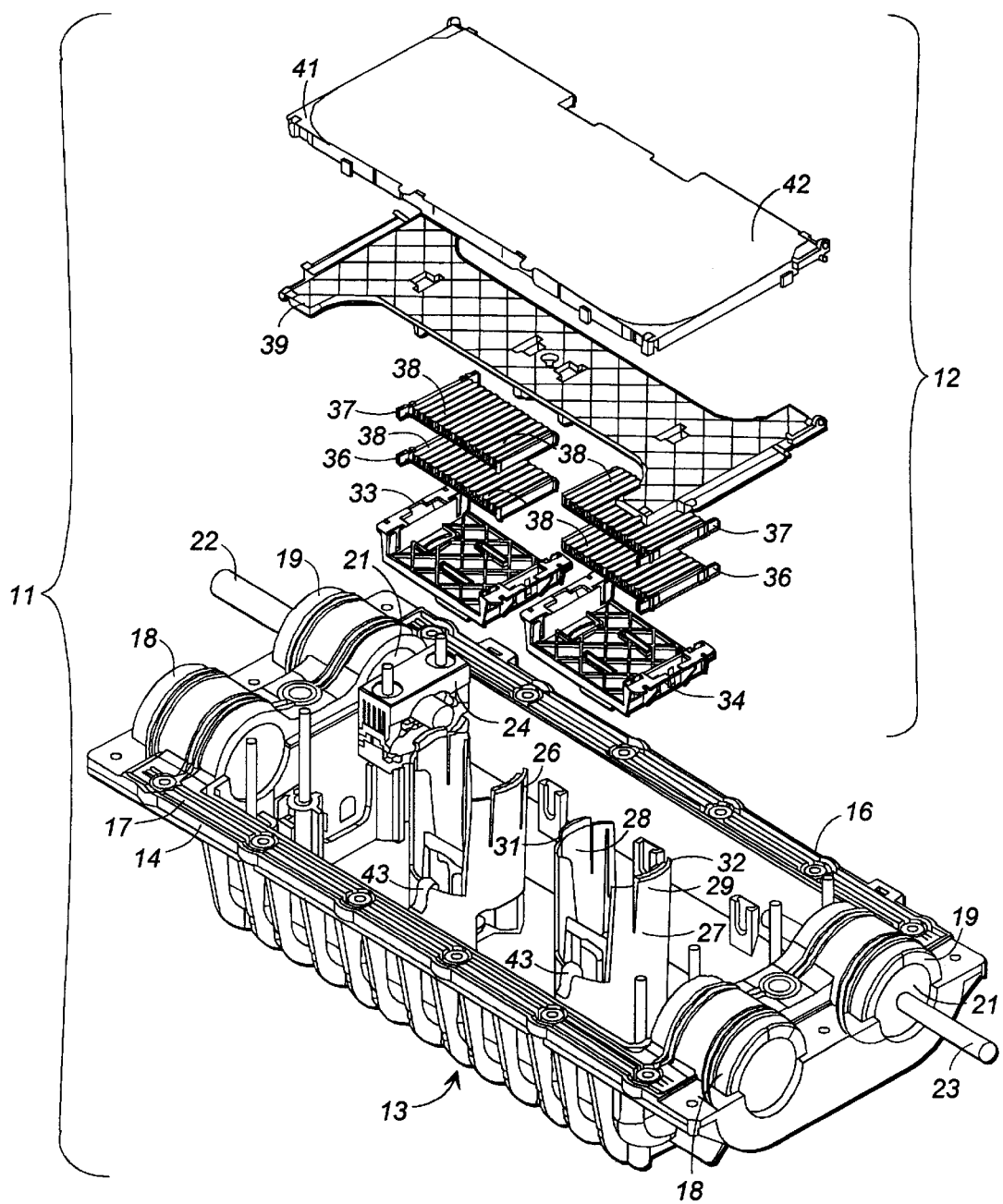
FIG. 1 is an exploded perspective view of a splice closure having a mass fusion splice tray of the present invention.

In FIG. 1 there is shown an exploded perspective view of the splice closure assembly 11 and of the mass fusion splice tray 12 of the present invention, which when assembled, make up a complete splice closure assembly.

The closure assembly 11, which, with the exception of the splice tray assembly 12, is the same as that disclosed in the aforementioned Burek el al. application, comprises a base member 13 and a cover member which is not shown but is disclosed in the aforementioned Burek et al. application, which, as noted hereinbefore, is incorporated herein by reference. Base member 13 has a deep trough-like configuration with flanges 14 and 16 for clamping, by bolts, not shown, or other means to the cover member having matching flanges. A flexible race track grommet 17 is interposed between the matching flanges of the base 13 and the cover member and functions as a sealing member therebetween. Grommet 17 also, at each end of the closure 11, has insert receiving members 18 and 19 which have bores therethrough for receiving insert members 21 which, in turn, receive entering and exiting cables 22 and 23. As is pointed out in the Burek et al. application, such an arrangement of grommet insert receiving member, insert, and cable maintain a moisture seal even under severe flexing of the cable. A grip block assembly 24, only one of which is shown, is mounted within the base member 13 and functions to grip the cable 22 or 23 tightly to immobilize it relative to the interior of the closure. Mounted to the floor of the base member 13 are first and second spaced pedestals 26 and 27 which are substantially cylindrical in shape and which have, at their distal ends, resilient fingers 28 and 29 which have, at their free ends, latch projections 31 and 32 which are designed to mate with the splice trays 33 and 34, of the present invention, as will be discussed hereinafter.

As thus far described, the splice closure 11, as shown in FIG. 1, is substantially identical to the splice closure of the Burek et al. application. The remainder of the detailed description is devoted to the splice tray assembly 12 of the invention and its relationship to the splice closure assembly 11.

The assembly 12 comprises the splice trays 33 and 34, each of which is adapted to be latched to the resilient fingers 28 and 29 of one of the pedestals 26 and 27. As will be apparent hereinafter, trays 33 and 34, when latched, are held securely atop their respective pedestals. Each of the splice trays 33, 34 is adapted to hold two splice holder inserts 36 and 37, in stacked fashion, which in turn, are adapted to hold two fusion splice holders 38 which are preferably made of a soft, resilient foam material. Each holder 38 preferably has six slots, so that each splice holder insert 36, 37 can contain the twelve splices. Thus, each of the trays can hold twenty-four mass fusion splices, for a total of forty-eight mass fusion splices contained within the closure assembly 11. A cover member 39 fits over both splice trays 33 and 34 and is latched thereto to hold the splice holder inserts in the trays and to afford a degree of protection for the splices. As will be apparent hereinafter, cover member 39 is adapted to have a discrete splice tray 41 pivotally mounted thereon and which has a cover 42 mounted thereon. With the tray 41 in place, it is highly desirable that means be provided for holding the cover 42 down to insure protection of and positional maintenance of the splices in tray 41. To this end, suitable straps 43 are attached to each of the pedestals 26, 27 and designed to loop up and over tray 41 and cover 42 to insure that the cover 42 is maintained in closed position. Straps 43 are preferably made of Velcro® or similar material, or at least have Velcro® along a portion of their length to obviate the need for locking buckles. Discrete splice tray 41 is adapted to have a second discrete splice tray pivotally mounted thereto, as shown in the Burek et al. patent application Ser. No. 08/847,214, and each discrete splice tray is designed to hold a maximum of thirty-six splices. Thus, the closure 11, when all splice trays are filled to the maximum, holds six hundred and forty-eight (648) splices.

With the various components as thus far discussed in place relative to base 13, the cover, not shown, is then attached to the base 13, as shown in the Burek el al. application, and the closure assembly 11 is complete.

Figure 2A:
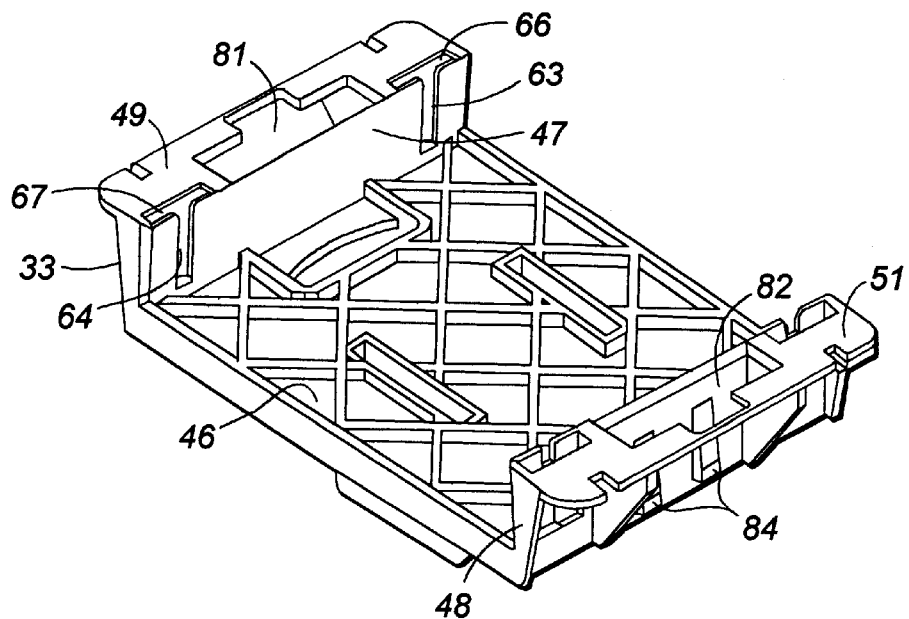
FIG. 2A is a top perspective view of the splice tray of the invention.
Figure 2B:
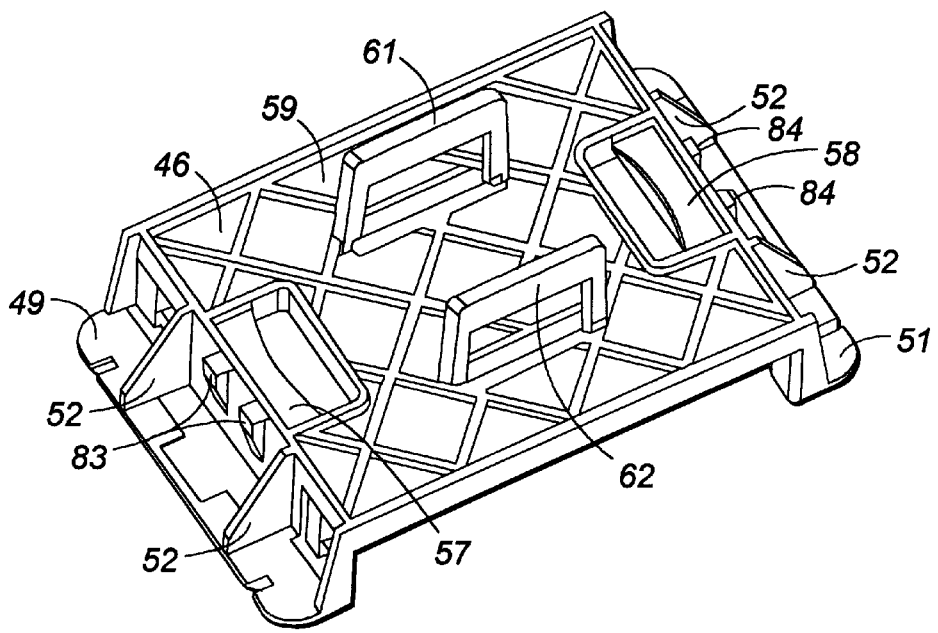
FIG. 2B is a bottom perspective view of the splice tray of the invention.
Figure 2C:
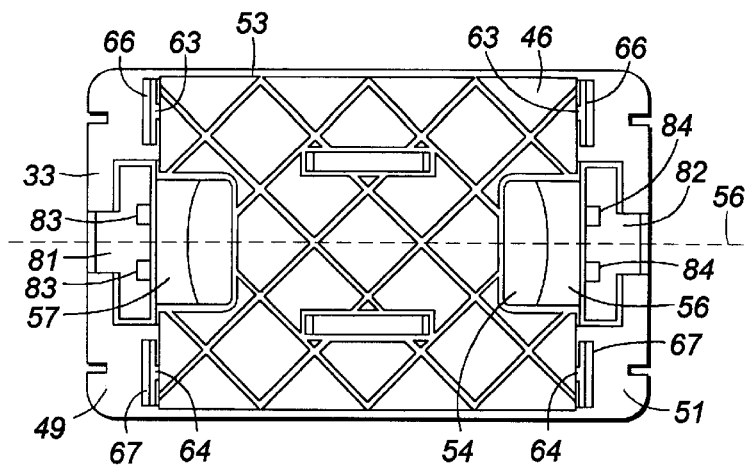
FIG. 2C is a plan view of the splice tray of FIGS. 2A and 2B.
Figure 2D:
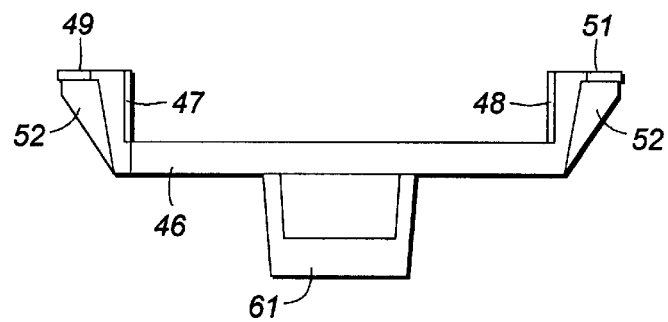
FIG. 2D is a side elevation view of the splice tray of FIG. 2C.
Figure 2E:
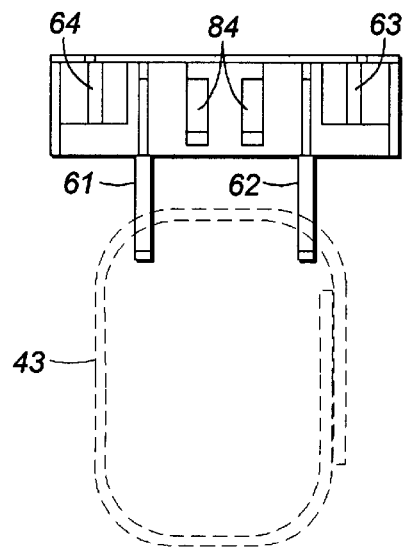
FIG. 2E is an end elevation view of the splice tray of FIG. 2D.

In FIGS. 2A through 2E there is shown in detail the splice tray 33 (or 34) of the invention which is adapted to be mounted on one of the pedestals 26 or 27. Inasmuch as splice trays 33 and 34 are identical, it is only necessary to describe one of them in detail. Tray 33 comprises a thin rectangular plate 46 having ribbed surfaces (for strength and stiffness) of a suitable material, such as a hard plastic. Plate 46 has, at each end thereof, upstanding wall members 47 and 48 which have projecting ledges 49 and 51. Ledges 49 and 51 are braced and strengthened by four bracing members 52, 52. Plate member 46 has first and second spaced openings 53 and 54 aligned along the centerline 56 thereof, each of which has a curved latching flange 57 and 58 therein. The curvature of each of flanges 57 and 58 is such that it matches the curvature of the pedestal 26 or 27, and, more particularly, the curvature of resilient fingers 28 and 29. Depending from the lower surface 59 of plate 46 are first and second U-shaped securing brackets 61 and 62 through which the straps 43 may be threaded to secure the trays 33 and 34 to the pedestal. Although the latching of latch projection 31 and 32 on fingers 28 and 29 to the flanges 57 and 58 is sufficient to mount the trays 33 and 34 to the pedestals 26 and 27, further securing the trays 33 and 34 by means of the straps 43 affords an added measure of security. In FIG. 2E strap 43 and the manner in which it loops through securing brackets 61 and 62 is shown in dashed lines as a loop, the lower portion of which loops through the corresponding pedestal. It is also possible that two straps 43 might be used, each having one end affixed to the pedestal and the other ends (or at least one thereof) looped through brackets 61 and 62 and joined together as by Velcro®.

Each of the upstanding walls 47 and 48 has a pair of spaced vertical slots 63 and 64 extending from projecting ledges 49 and 51 toward plate 46, and each of the projecting ledges 49 and 51 has a pair of spaced transverse slots 66 and 67 which communicate, respectively, with slots 63 and 64, thereby forming a T-shaped slotted opening which will be discussed further in connection with the splice holder inserts 36 and 37, shown in FIGS. 3A through 3D.

Figure 4C:
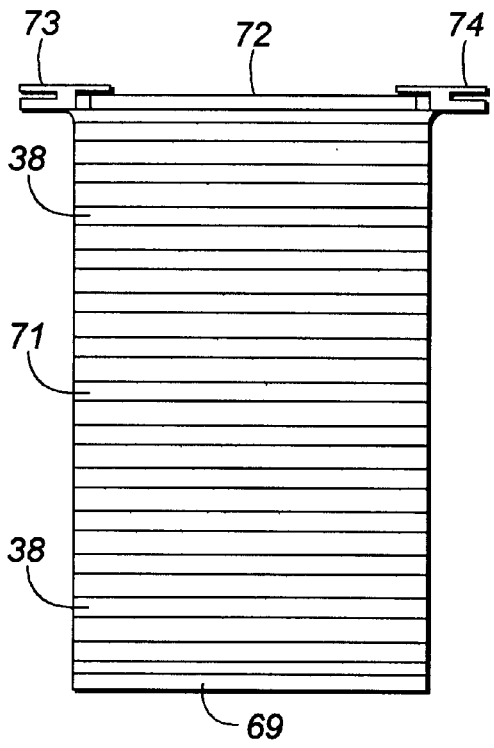
FIG. 4C is a perspective view of the arrangement of FIG. 4A.
Figure 4C:
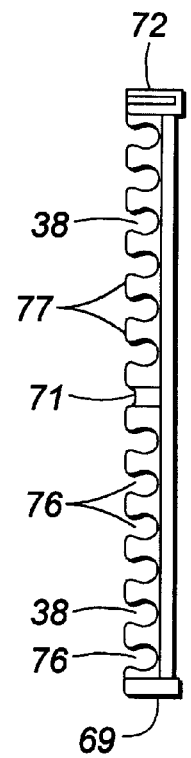
Figure 4C:
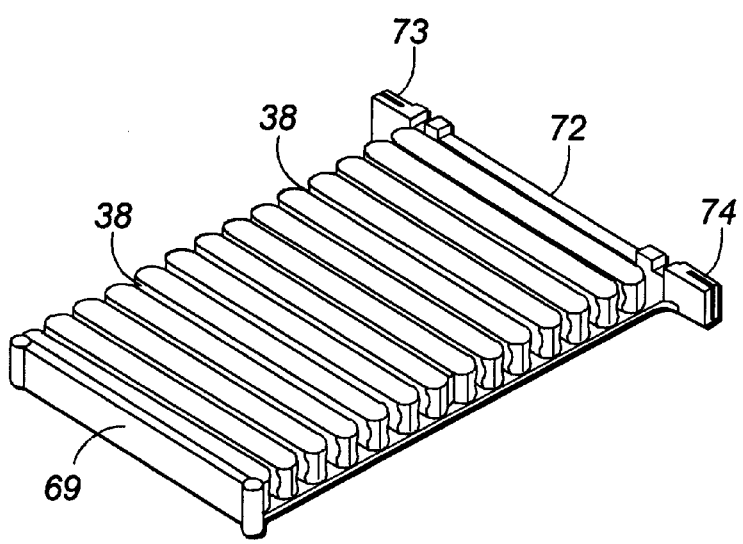
Figure 5:
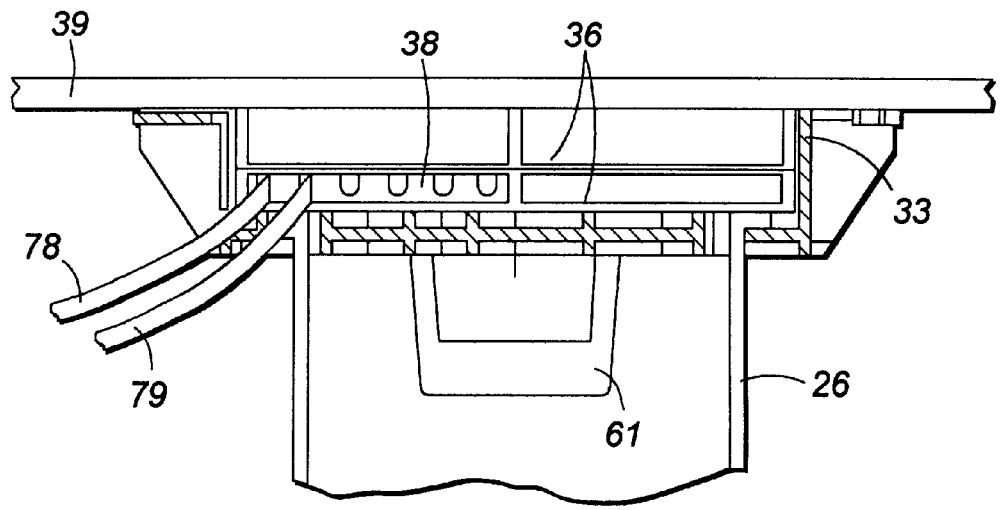
FIG. 5 is a partial cross-sectional elevation view of the pedestal, splice tray, splice holder inserts, the splice holder, and the cover member of the splice tray assembly of the present invention.

Splice holder inserts 36 and 37 which are for holding two splice holders 38,38, and for mounting them to the splice trays, are preferably made of a hard plastic material, and each comprises a floor member 68. Floor 68 has a front wall 69, an intermediate wall 71, and a rear wall 72. Rear wall 72 is, as shown, wider than walls 69 and 72, which are the same width as floor member 68. Extending from the rear of wall 72 are first and second T-shaped locating members 73 and 74 with the legs of the T-shapes being spaced apart a distance equal to the spacing of locating slots 63 and 64 in the tray 33, so that the splice holder insert 36 can be lowered down the slots 63 and 64 to rest upon the splice tray plate 46 and held in place by the cross arms of members 73 and 74. As is shown in FIG. 5, a second splice holder insert 36 can also be lowered in the slots 63 and 64 to rest upon the top edges of walls 69 and 72. As is shown in FIGS. 4A and 4C, two fusion splice holders 38 can be held in each splice holder insert 36 and held in place by, for example, suitable adhesive means, not shown, such as a double sided adhesive tape, or by suitable cement. Each splice holder 38 is preferably made of a soft, resilient foam material and comprises a plurality of slots 76 separated by lands 77. The slots or grooves 76 are each adapted to hold an encased fusion splice therein, and, because of the resilience of the holder material, to grip it firmly. In normal usage, there are six grooves, hence six splices, per splice holder and each splice holder insert 36 can hold twelve such splices. Inasmuch as the arrangement is primarily designed for fiber ribbons containing, for example, twelve fibers, each splice holder insert 36, 37 accommodates one hundred and forty-four (144) spliced fibers. Thus, when the splice holder inserts are stacked as shown in FIG. 5, each splice tray accommodates two hundred and eighty-eight (288) spliced fibers. Two such trays per closure, as shown in FIG. 1 thus accommodates five hundred and seventy-six (576) spliced fibers, which represents a large increase in closure capacity.

Figure 6:
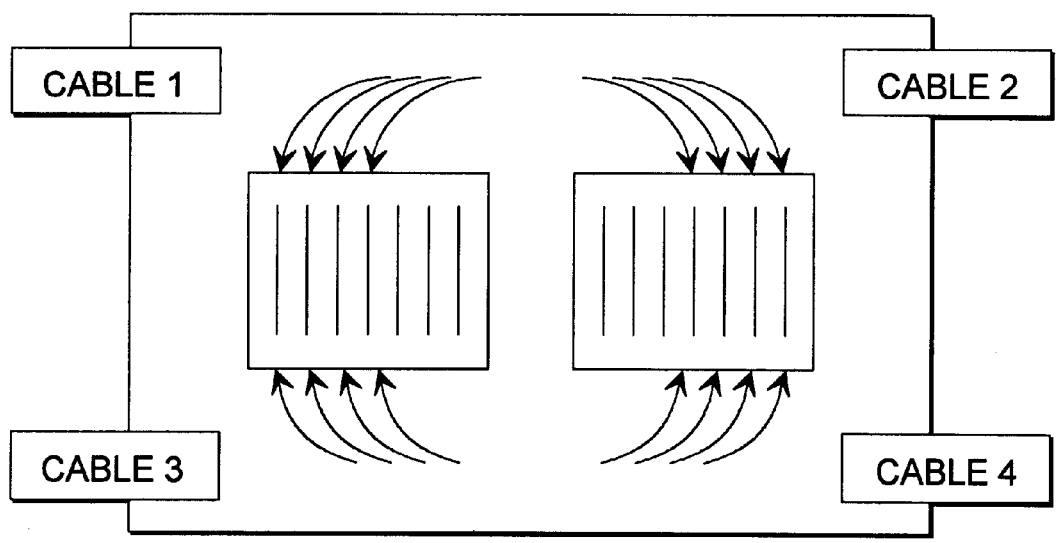
FIG. 6 is a diagrammatic view of the arrangement of the fiber ribbons relative to the splice holders.

FIG. 5 is an elevation view, in partial cross-section, of the arrangement just discussed, wherein it can be seen that two splice holder inserts 36 are stacked in the tray 33. Two fiber ribbons 78 and 79 are shown entering (or exiting) the splice holder 38 with a vertical orientation, i.e., the broad dimension, or width, of the ribbon is oriented vertically. FIG. 6 is a diagrammatic view of the dressing of the ribbons into and out of the splice holders 38. It can be seen that the tray 33 or 34 performs no storage function. The ribbons enter one open side of the tray and exit out of the other open side of the tray, with all slack fiber being stored in the well created between the bottoms of the trays and the floor of the base member 13 of the closure.

As was pointed out in the foregoing, the cover member 39 is snapped onto the splice trays 33 and 34. In order that this may be accomplished, each of the projecting ledges 49 and 51 has a large, semi T-shaped opening 81, 82 therein below which are situated, on the corresponding upstanding wall 47, 48, wedge shaped projecting latches 83 and 84, which, as can best be seen in FIG. 2A, slope toward the openings 81, 82, which function to latch the cover or adapter plate member 39 securely in place, as will be discussed more fullly hereinafter.

Figure 7A:
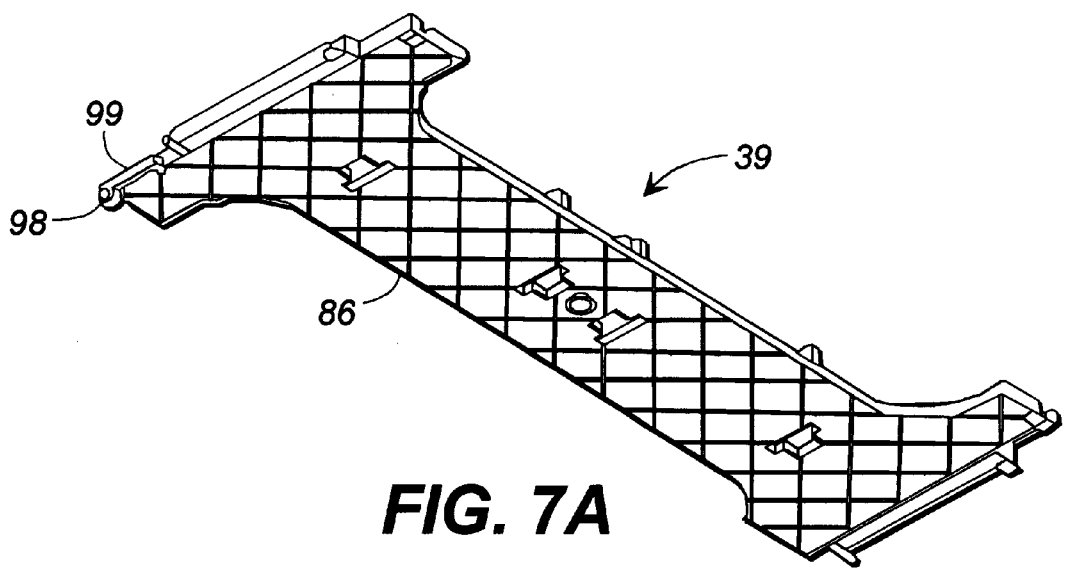
FIG. 7A is a perspective view of the cover member of the assembly of FIGS. 1 and 5, showing the top surface thereof.
Figure 7B:
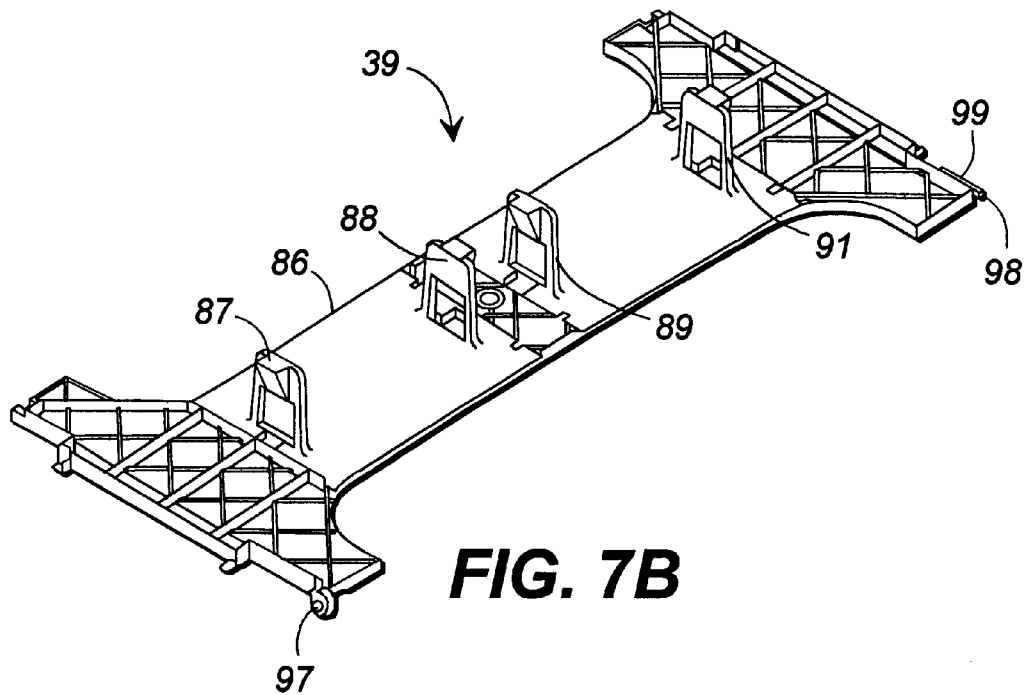
FIG. 7B is a perspective view of the cover member of FIG. 7A; showing the bottom surface thereof.
Figure 7C:
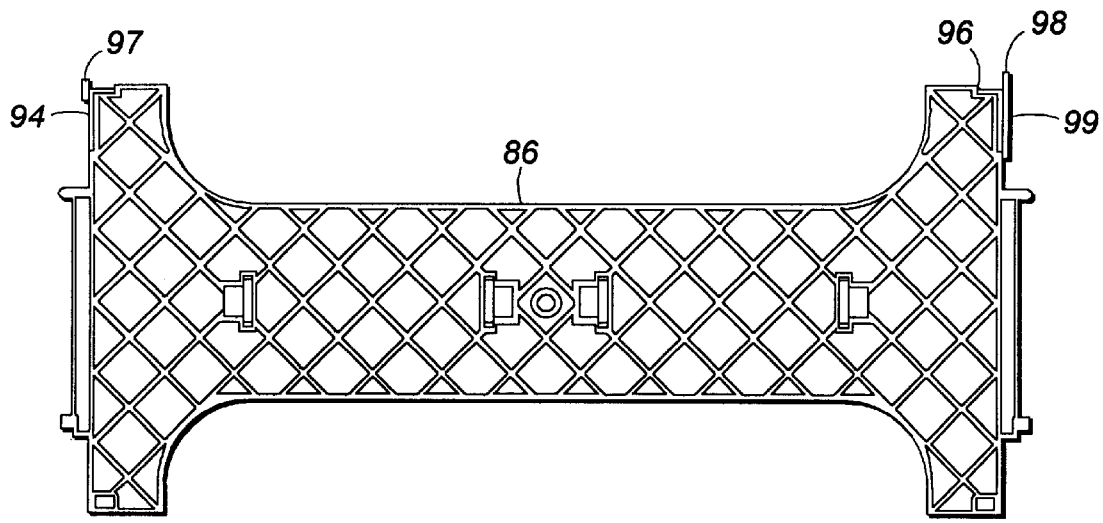
FIG. 7C is a plan view of the cover member.
Figure 7D:
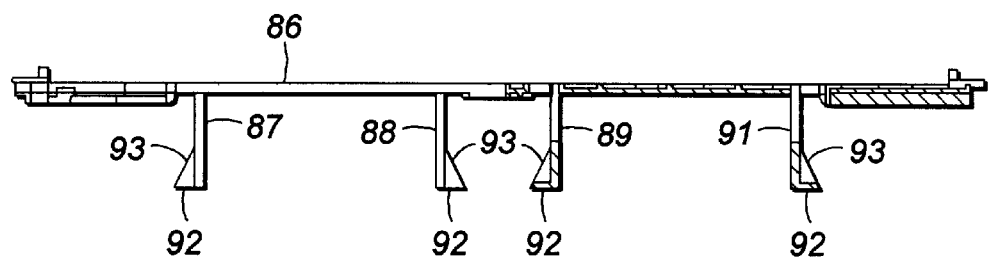
FIG. 7D is a side elevation view of the cover member of FIGS. 7A, 7B, and 7C.
Figure 7E:
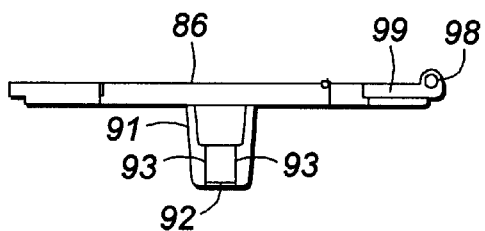
FIG. 7E is an end elevation view of the cover member.

The cover or adapter plate member 39 is shown in FIGS. 7A through 7E, and comprises a thin plate 86 of suitable material, preferably a hard plastic, and is ribbed, as shown, for added stiffness and resistance to warping or bowing. Depending from the lower side thereof, as best seen in FIGS. 7B and 7D are four spaced latching legs 87, 88, 89, and 91 each having, at its distal end, an L-shaped latch 92 with tapered strengthening members 93. Pairs of legs 87, 88 and 89, 91 are spaced apart a distance such that each latching arm can pass through one of the openings 81, 82 in the corresponding splice tray 33 or 34. When assembly of cover or adapter plate member 39 to the splice trays 33 and 34 is being performed, the arms 87, 88, 89, and 91 are forced or cammed outward by the sloping wedge shaped latches 83, 84 until the L-shaped latches 83, 84 until the L-shaped latches 92 engage the underside of the corresponding projecting latch 83 or 84, which causes arms 87, 88, 89, and 91 to spring back to their original vertical position, thereby maintaining the L-shaped latches and the wedge shaped latches in engagement and affixing cover or adapter plate 39 in position.

As can be seen in FIG. 7A through 7C, cover member 39 has somewhat of a dumbbell shape and, at two of the outer corners 94 and 96 are pivot pin receiving bushings 97 and 98 which are adapted to receive the pivot pins on, for example, a discrete splice tray, not shown, such as is shown in the aforementioned Burek et al. application. Bushing 97 is preferably fixed in place, bushing 98, however, forms the end of a resilient finger 99 which, as shown, extend from the side of cover member 39 toward the corner. Thus, in pivotally mounting a discrete splice tray to the cover member 39, the operator flexes finger 99 to permit easy insertion of the pivot pins on the splice tray, thereby achieving a pivotal mounting thereof. When such a splice tray is so mounted, straps 43 are adapted to loop over the tray, thereby providing an additional securing thereof as well as holding the top of the splice tray closed.

The foregoing description and accompanying drawings have been for purposes of illustrating, in a preferred embodiment, the principles and features of the present invention. The splice tray assembly at least doubles the capacity of the splice closure of the aforementioned Burek et al. application without altering or otherwise changing the closure. Thus, increasing the capacity of such closure can be readily accomplished with existing installations in the field.

It should be noted that it will be obvious to those skilled in the art that many variations and modifications maybe made to the preferred embodiment without substantial departure from the principles of the invention, It is intended that all such variations and modifications be included herein as being within the scope of the present invention. Further, in the claims hereinafter set forth, the corresponding structures, materials, acts, and equivalents thereof and all means or step plus function elements are intended to include any structure, materials, or acts for performing the functions with other elements as specifically claimed.

We claim:

1. For use in a splice closure having a floor and at least one support member extending therefrom wherein the support member has a distal end with latching means thereon, an optical fiber splice tray assembly comprising:

a splice tray comprising a plate member having first and second ends and first and second surfaces;

a first wall member extending from said first surface of said plate member at said first end and a second wall member extending from said first surface of said plate member at said second end, each of said wall members having an upper edge and a ledge projecting therefrom;

latching means in said plate member adjacent each of said wall members for mating with the latching means on the support member;

a splice holder insert having first and second locating members thereon;

locating slots in said wall members for receiving and holding said locating members;

a cover member comprising a plate member having first and second surfaces;

at least two spaced latching legs depending from said first surface of said plate member; and latching means on said wall members for mating with said latching legs to secure said cover member to said splice tray.

2. The splice tray assembly as claimed in claim 1 wherein said ledge projecting from each of said first and second wall members has an opening therein through which one of said latching legs passes.

3. The splice tray assembly as claimed in claim 2 wherein said latching means on said wall members comprises at least one wedge shaped latch.

4. The splice tray assembly as claimed in claim 1 wherein the latching means in said plate member comprises first and second openings in said plate member and a latching flange in each of said openings.

5. The splice tray assembly as claimed in claim 4 wherein each of said latching flanges is curved to conform to the configuration of the support member extending from the floor of the splice closure.

6. The splice tray assembly as claimed in claim 1 wherein said second surface of said splice tray plate member has first and second spaced securing brackets extending therefrom.

7. The splice tray assembly as claimed in claim 1 wherein each of said securing brackets is U-shaped for receiving securing means on the support member.

8. The splice tray assembly as claimed in claim 1 wherein said cover member has means thereon for pivotally mounting a discrete splice tray thereon.

* * * * *